Aug. 12, 1969 P. B. CUNNINGHAM 3,461,397
BALANCED DIFFERENTIAL AMPLIFIER WITH IMPROVED LONGITUDINAL VOLTAGE MARGIN
Filed April 18, 1968
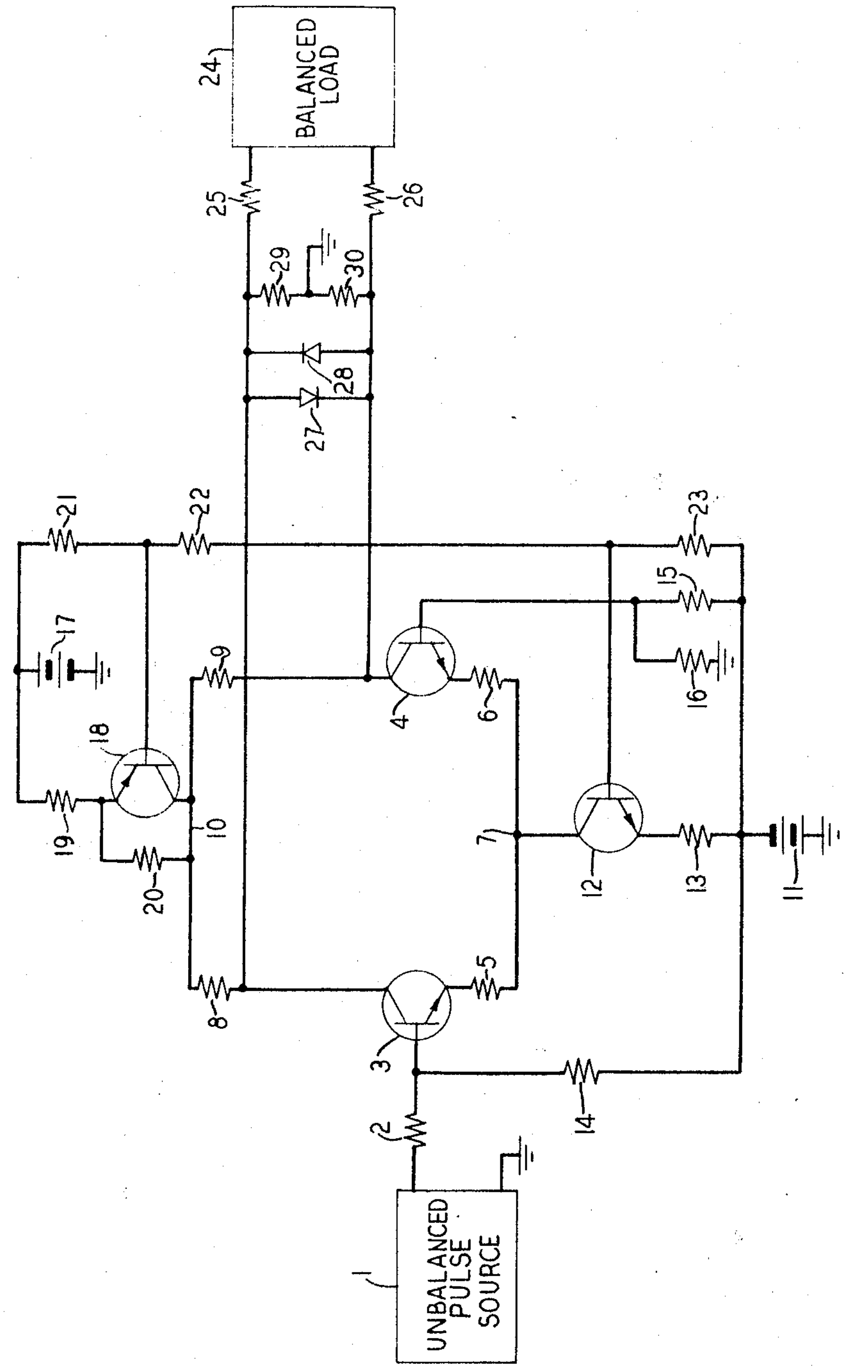
INVENTOR
P. B. CUNNINGHAM
BY R B Ardis
ATTORNEY United States Patent Office 3,461,397
Patented Aug. 12, 1969

3,461,397
BALANCED DIFFERENTIAL AMPLIFIER WITH IMPROVED LONGITUDINAL VOLTAGE MARGIN

Peter B. Cunningham, North Andover, Mass., assignor to Bell Telephone Laboratories, Incorporated, Murray Hill, N.J., a corporation of New York Filed Apr. 18, 1968, Ser. No. 722,338
Int. Cl. H03f 3/68
U.S. Cl. 330—30 3 Claims

ABSTRACT OF THE DISCLOSURE

An unbalanced to balanced converter for pulse type signals takes the form of an emitter-coupled transistor differential amplifier in which the effects of longitudinal voltages on the balanced output line are suppressed by using both a constant current emitter biasing source and a constant current collector biasing source.

Background of the invention

This invention relates generally to circuits for driving a balanced load and more particularly, although in its broader aspects not exclusively, to circuits for converting an unbalanced pulse signal to a balanced pulse signal for transmission to a balanced load.

In the past, the most common arrangements for converting unbalanced signals to balanced signals have generally made use of transformer coupling. Transformer coupling is particularly advantageous in such circumstances because of its high discrimination against the effects of longitudinal voltages which may appear on the output lines. Without such discrimination, longitudinal voltages are likely to be transformed into transverse voltages which are indistinguishable from wanted signals and result in increased noise and distortion. Transformers have the disadvantages, however, of not being able to transmit the D-C components of pulse type signals and of not being reproducible by modern integrated circuit techniques.

Other circuits have been devised which are capable of both converting unbalanced signals to balanced signals and transmitting D-C, but they generally suffer from offsetting disadvantages. Such circuits as emitter-coupled transistor differential amplifiers are effective in performing the required conversion, but they tend to be sensitive to longitudinal voltages on their ouput lines. Other circuits, using emitter-follower drivers to couple directly to the balanced output line, require high value of quiescent bias current and result in excessive power dissipation. In addition, small unbalances in emitter-follower output impedances can introduce a longitudinal to transverse voltage conversion on the output line.

One object of the invention is to eliminate sensitivity to longitudinal voltages in an unbalanced to balanced converter for pulse type signals in as simple as manner as possible.

Another and more particular object is to eliminate sensitivity to longitudinal voltages in an unbalanced to balanced converter for pulse type signals without the use of transformers and without excessive power dissipation.

Summary of the invention

In accordance with the invention, an emitter-coupled transistor differential amplifier is employed as an unbalanced to balanced converter in order to permit the transmission of pulse signals with a D-C component and the effects of longitudinal voltages on the balanced output line are suppressed by using not only a constant current emitter biasing source but also a constant current collector biasing source for the transistors. The converter provides a high degree of output balance and both transistor collector electrodes are free to move up and down with longitudinal voltages on the balanced output line, preventing any conversion of such voltages to a form which would be indistinguishable from signal voltages.

In at least one preferred embodiment of the invention, each constant current biasing source includes the emitter-collector path of another transistor in series with a direct voltage source. Each biasing source transistor is itself biased so that its emitter- collector path presents an impedance which is high in comparison with the collector load impedances of the associated differential amplifier transistors.

A more complete understanding of the invention may be obtained from the following detailed description of a specific embodiment.

Brief description of the drawing

The single figure of the drawing illustrates a specific embodiment of the invention employed as an unbalanced to balanced converter for pulse type signals.

Detailed description

In the illustrated embodiment of the invention, a pulse signal source 1 whose output is unbalanced with respect to ground has its ungrounded output connected through a resistor 2 to the base electrode of an n-p-n transistor 3. Transistor 3 and another matched n-p-n transistor 4 form an emitter-coupled differential amplifier and have their emitter electrodes connected through respective resistors 5 and 6 to a common point 7. The collector electrodes of transistors 3 and 4 are connected through respective collector resistors 8 and 9 to a common point 10.

In accordance with the invention, not only the emitters but also the collectors of differential amplifier transistors 3 and 4 are supplied with current from constant current biasing sources. To bias both emitter electrodes in the forward direction, common point 7 is connected to a negative voltage source 11 through the emitter-collector path of an n-p-n transistor 12 and a biasing resistor 13. As shown, the collector electrode of transistor 12 is connected to common point 7, resistor 13 is conneted between the emitter electrode of transistor 12 and negative voltage source 11, and the positive side of negative voltage source 11 is grounded. To complete the emitter-base biasing of differential amplifier transistors 3 and 4, respective resistors 14 and 15 are returned to negative biasing source 11 from their base electrodes and a resistor 16 is connected from the base electrode of transistor 4 to ground. Finally, to bias the collector electrodes of transistors 3 and 4 in the reverse direction, common point 10 is connected to a positive voltage source 17 through the emitter-collector path of a p-n-p transistor 18 and a biasing resistor 19. As shown, the collector electrode of transistor 18 is connected to common point 10, resistor 19 is connected between the emitter electrode of transistor 18 and positive voltage source 17, and the negative side of positive voltage source 17 is grounded. An additional resistor 20 is connected directly across the emitter-collector path of transistor 18 to by-pass approximately 60 percent of the current supplied and limit the power dissipation of transistor 18 to a safe value. Three voltage dividing resistors 21, 22, and 23 are connected in series from positive voltage source 17 to negative voltage source 11, with the base electrode of transistor 18 connected to the junction between resistors 21 and 22 and the base electrode of transistor 12 connected to the junction between resistors 22 and 23.

The balanced output from the differential amplifier is taken directly from the collectors of transistors 3 and 4. A balanced load 24, which may in fact be a balanced transmission line, has one side supplied from the collector electrode of transistor 3 through a resistor 25 and the other supplied from the collector electrode of transistor 4 through a resistor 26. The magnitude of the balanced pulse signals supplied to load 24 is limited by a pair of oppositely poled semiconductor diodes 27 and 28 connected in parallel between the collector electrodes of transistors 3 and 4. Finally, a pair of resistors 29 and 30 are connected in series between the collector electrodes of transistors 3 and 4 and the junction between them is grounded.

In the illustrated embodiment of the invention, the following elements and element values may be employed to particular advantage:

Resistors:

| | | |
|---|---|---|
| 2 | ohms | 5360 |
| 5 and 6 | do | 100 |
| 8 and 9 | do | 383 |
| 13 and 19 | do | 361 |
| 14 and 15 | do | 4990 |
| 16 | do | 3570 |
| 20 | do | 619 |
| 21 | do | 2100 |
| 22 | do | 7500 |
| 23 | do | 2400 |
| 25 and 26 | do | 20 |
| 29 and 30 | do | 511 |

Transistors:

| | |
|---|---|
| 3 and 4 | Western Electric 22B |
| 12 | Western Electric 16J |
| 18 | 2N3250 |

| | |
|---|---|
| Diodes 27 and 28 | Western Electric 458C |
| Voltage sources 11 and 17 | volts 24 |

In operation, the collectors of transistors 3 and 4 are biased at zero volts when the bases of transistors 3 and 4 are at equal potentials. The base at transistor 4 is biased at −10 volts by resistors 15 and 16. The values of resistors 2 and 14 are selected so that when the input signal from pulse source 1 is at +5 volts (halfway between on and off), the base of transistor 3 is at −10 volts. When the input signal is greater than +5 volts, the collector of transistor 3 swings negatively and the collector of transistor 4 swings positively. When the input signal is less than +5 volts, the collector of transistor 3 swings positively and the collector of transistor 4 swings negatively. This result in the slicing of the input pulse signal at half amplitude and in the generation of a balanced output signal whose pulse width is equal to that of the input at half amplitude. The voltage swing at the collectors of transistors 3 and 4 is limited to 1.4 volts peak-to-peak by diodes 27 and 28. Resisors 25 and 26 limit the final output signal amplitude to 1 volt peak-to-peak.

Resistors 5 and 6 in series with the respective emitter electrodes of differential amplifier transistors 3 and 4 reduce the amplifier gain and improve the performance with large amplitude input pulses. The constant current source transistor 12 provides for a closely balanced output from the amplifier even though the amplifier is driven from an unbalanced input. Transistor 12 also aids in reducing any amplifier sensitivity to power supply variations.

In accordance with an important feature of the invention, transistor 18 provides a substantially constant current for the collectors of transistors 3 and 4. Because of the high impedance of the emitter-collector path of transistor 18 and because the base electrodes of transistors 3 and 4 are biased negatively, the collector voltages of transistors 3 and 4 are free to move up and down with any longitudinal voltages on the balanced output line. Generation of corresponding transverse voltages which could not be distinguished from signal voltages is thus avoided.

It is to be understood that the above-described arrangement is illustrative of the application of the principles of the invention. Numerous other embodiments may be devised by those skilled in the art without departing from the spirit and scope of the invention.

What is claimed is:

1. A differential amplifier adapted to supply a balanced load and having a high degree of discrimination against longitudinal voltages on the output connections to said load which comprises a pair of transistors each having base, collector, and emitter electrodes, first and second constant current regulators each having at least an input terminal and an output terminal, means connecting the emitter electrode of said first and second transistors to the constant current output terminal of said first regulator, a pair of impedance elements individually connecting the collector electrodes of said pair of transistors to the constant current output terminal of said second constant current regulator, output connections for said load from the collector electrodes of said transistors, first and second sources of potential each having a positive and a negative terminal, means to connect an input signal source to the base electrode of one of said pair of transistors, means to connect the base electrode of the other of said pair of transistors to the negative terminal of said first source of potential, means connecting the positive terminal of said first source to the negative terminal of said second source, means to connect the input terminal of said first constant current regulator to the negative terminal of said first source of potential, means to connect the positive terminal of said second source of potential to the input electrode of said second constant current regulator, and means to connect the input terminal of said first constant current regulator to the input terminal of said second constant current regulator to prevent potential variations in said first and second sources of potential from appearing as longitudinal voltages on the output connections to said load.

2. A differential amplifier in accordance with claim 1 in which said first constant current regulator comprises the emitter-collector path of a third transistor serially connected with the negative terminal of said first source of potential and the emitter electrodes of said pair of transistors, and said second constant current regulator comprises the emitter-collector path of a fourth transistor serially connected with the positive terminal of said second source and said pair of impedance elements.

3. A differential amplifier in accordance with claim 2 wherein said means to connect the input terminal of said first constant current regulator to the negative terminal of said first source of potential comprises a first resistor, said means to connect the positive terminal of said second source of potential to the input electrode of said second constant current regulator comprises a second resistor, and said means to connect the input terminal of said first constant current source to the input terminal of said second constant current regulator comprises a third resistor.

References Cited

UNITED STATES PATENTS

| | | | |
|---|---|---|---|
| 3,310,688 | 3/1967 | Ditkofsky | 330—30 X |
| 3,346,817 | 10/1967 | Walker et al. | 330—69 X |

ROY LAKE, Primary Examiner

LAWRENCE J. DAHL, Assistant Examiner

U.S. Cl. X.R.

330—14